United States Patent
Yonekubo 4,174,151

Nov. 13, 1979

[54] MICROSCOPE OBJECTIVE LENS SYSTEM

[75] Inventor: Ken Yonekubo, Tama, Japan

[73] Assignee: Olympus Optical Co., Ltd., Tokyo, Japan

[21] Appl. No.: 788,962

[22] Filed: Apr. 19, 1977

[30] Foreign Application Priority Data

Apr. 20, 1976 [JP] Japan .................. 51-45211

[51] Int. Cl.$^2$ .............................. G02B 9/34
[52] U.S. Cl. ................. 350/175 ML; 350/176; 350/177; 350/224
[58] Field of Search ............ 350/175 ML, 176, 177, 350/224

[56] References Cited

FOREIGN PATENT DOCUMENTS 1008368  10/1965  United Kingdom ............... 350/176

Primary Examiner—Paul A. Sacher
Attorney, Agent, or Firm—Cushman, Darby & Cushman

[57] ABSTRACT

A microscope objective lens system having a large working distance which comprises a first positive meniscus lens component, a second positive cemented lens component, a third positive cemented lens component and a fourth negative meniscus lens component and wherein a flat image plane is obtained.

4 Claims, 5 Drawing Figures

MICROSCOPE OBJECTIVE LENS SYSTEM

BACKGROUND OF THE INVENTION

1. Field of the Invention

The present invention relates to a microscope objective lens system and more specifically to a microscope objective lens system having large working distance.

2. Description of the Prior Art

A cover glass approximately 0.17 mm thick is used for general microscopic observations. In order to observe cells which are being cultivated in a culture dish, however, it is obliged to observe such cells through a transparent bottom 0.8 to 1.2 mm thick of said culture dish which has far larger thickness than a cover glass. Further, it is also obliged to observe the cells in such a condition that they are floating in a culture fluid. For the reasons mentioned above, an objective lens system for microscopes must have large working distance. On the other hand, chromatic aberration, spherical aberration and coma will generally tend to be aggravated in a plan objective lens system having a large working distance.

SUMMARY OF THE INVENTION

It is therefore a general object of the present invention to provide a microscope objective lens system which has a long working distance and wherein image plane is flat, and chromatic abberration,, spherical aberration and coma are favorably corrected.

The lens system according to the present invention comprises a front lens group comprising a first positive meniscus lens component having a concave surface on the object side and a second positive cemented lens component, a relatively thick airspace, and a rear lens group comprising a third positive cemented lens component and a fourth negative meniscus lens component having a concave surface on the image side. Said lens system satisfies the conditions enumerated below:

(1) $1.65 < n_1, n_6$
(2) $25 < \nu_1, \nu_6 < 50$
(3) $f < f_1 < 2.5f$
(4) $3f < |f_4| < 4.5f$
(5) $0.5f < d_5 < 2f$ wherein the reference symbols represent as defined below:

$n_1$ and $n_6$: refractive indices of said first and fourth lens components respectively.

$\nu_1$ and $\nu_6$: Abbe's numbers of said first and fourth lens components respectively $d_6$: airspace located between said front and rear lens groups $f_1$ and $f_4$: focal lengths of said first and fourth lens components respectively f: focal length of the entire lens system as a whole In the objective lens system having such a composition as described above, glass materials having high refractive indices and low dispersion are selected for the first and fourth lens components so that said lens components can satisfy the conditions (1) and (2), thereby flattening the image plane and correcting lateral chromatic aberration. If refractive indices $n_1$ and $n_6$ are smaller than 1.65 in the condition (1), curvature of field will be so aggravated that it is impossible to obtain a flat image plane. When Abbe's numbers $\nu_1$ and $\nu_6$ are smaller than 25 in the condition (2), longitudinal chromatic aberration will be under-corrected and, in addition, lateral chromatic aberration will be over-corrected. If Abbe's numbers $\nu_1$ and $\nu_6$ exceed the upper limit of 50, longitudinal chromatic aberration will be over-corrected and lateral chromatic aberration will be under-corrected.

The first and fourth lens components are designed as meniscus lenses having concave surfaces on the object side and image side respectively. Such a design is effective for properly balancing various aberrations, and serves also for preventing degradation in flatness of image plane which is apt to be caused in an objective lens system having a large working distance and correcting coma. The fourth lens component serves not only for correcting aberrations but also prolonging working distance (WD) by displacing the principal plane of the entire lens system as a whole. If the first lens component of these two lens components has a focal length $f_1$ shorter than the lower limit of the condition (3) ($f_1 < f$), working distance will be too short. If the focal length $f_1$ excees the upper limit of the condition (3) ($f_1 < 2.5f$), in contrast, coma and spherical aberration will be aggravated. When the fourth lens component has a focal length $f_4$ shorter than the lower limit of the condition (4) ($|f_4| < 3f$), coma will be under-corrected. When the focal length $f_4$ exceeds the upper limit defined by the condition (4) ($|f_4| < 4.5f$), working distance will be too short.

In addition to the conditions consecutively described above, it is preferable to select refractive indices $n_{II}$, $n_{III}$ and Abbe's numbers $\nu_{II}$ and $\nu_{III}$ of positive lens elements in the second and third lens components within the ranges defined by the conditions (6) and (7) below for the purpose of more favorably correcting longitudinal chromatic aberration and lateral chromatic aberration which are produced by the first and fourth lens components.

(6) $1.45 n_{II}, < n_{III} < 1.55$, (7) $60 < \nu_{II}, \nu_{III} < 85$

DESCRIPTION OF THE PREFERRED EMBODIMENTS

Figures 1, 2:
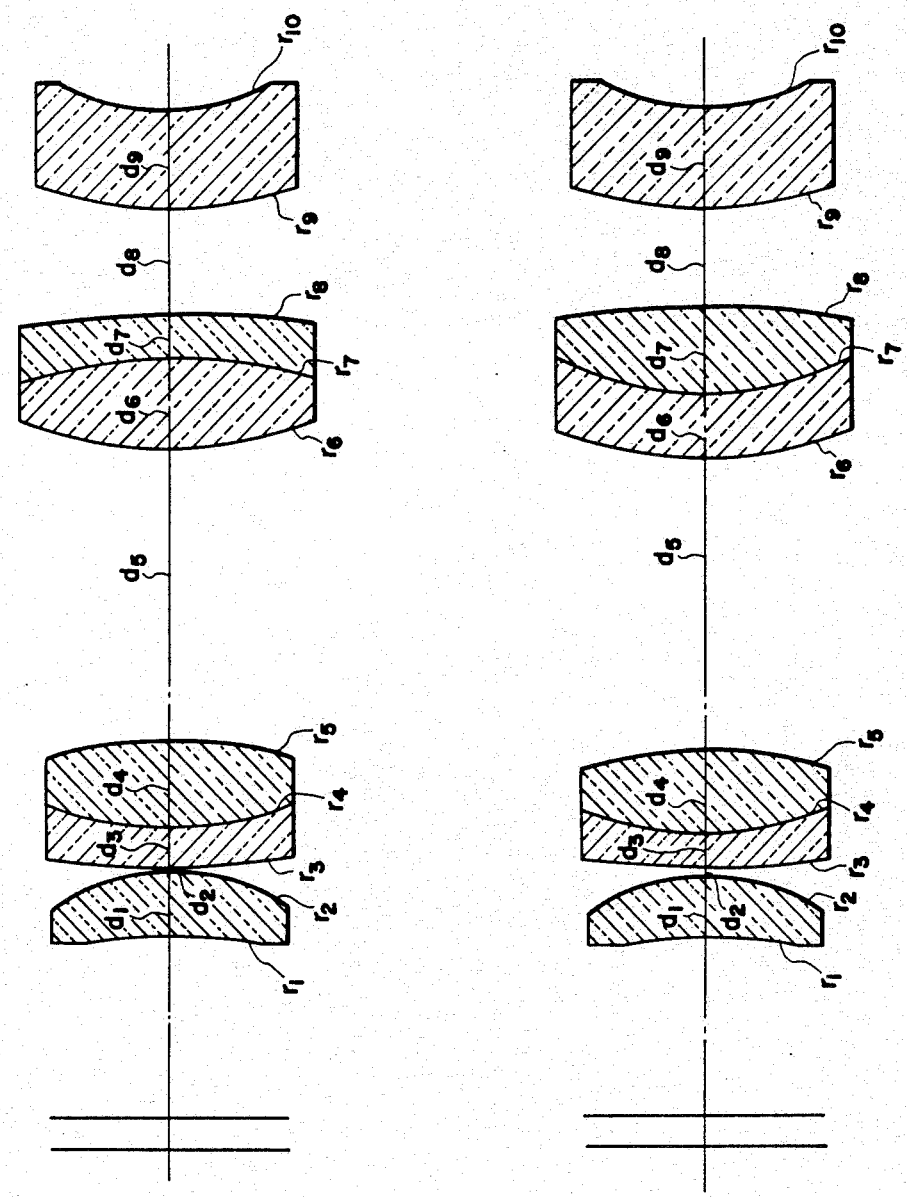
FIG. 1 shows a sectional view illustrating the composition of the Embodiments 1 and 2 of the microscope objective lens system according to the present invention.
FIG. 2 shows a sectional view illustrating the composition of the embodiment 3.
Figure 3:
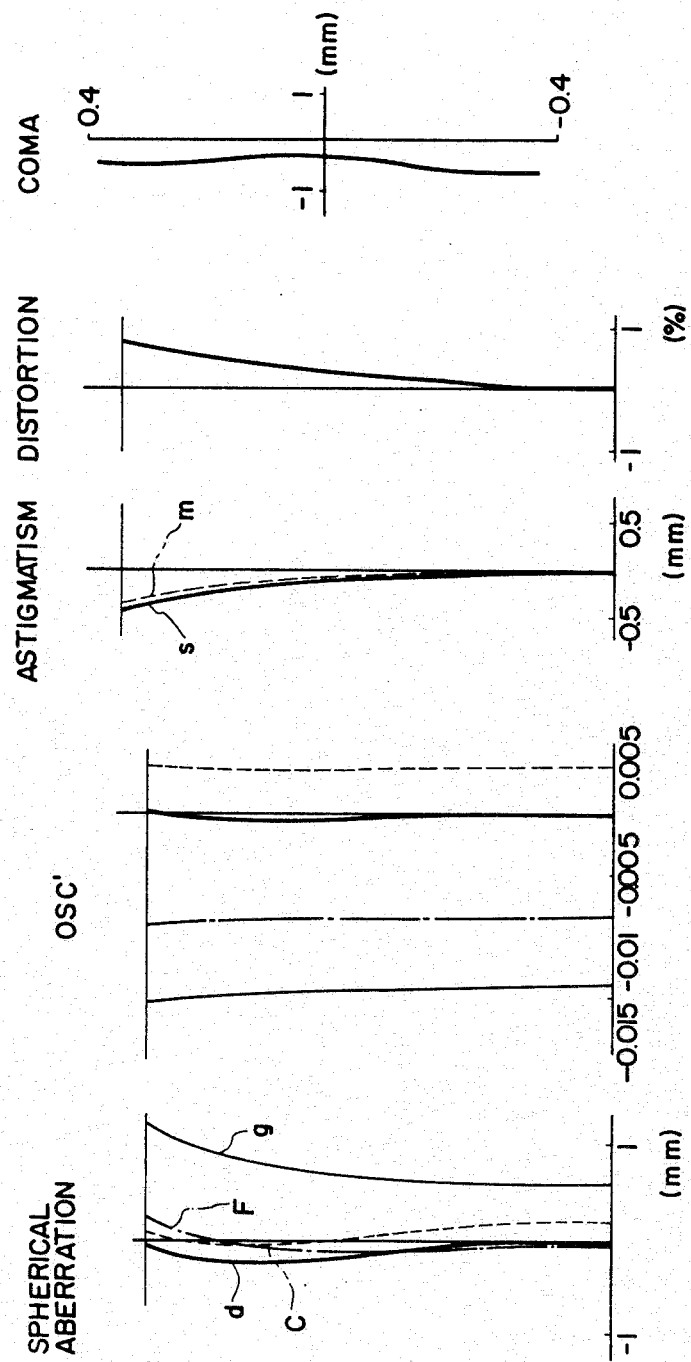
FIG. 3 illustrates curves showing the aberration characteristics of the Embodiment 1.
Figure 4:
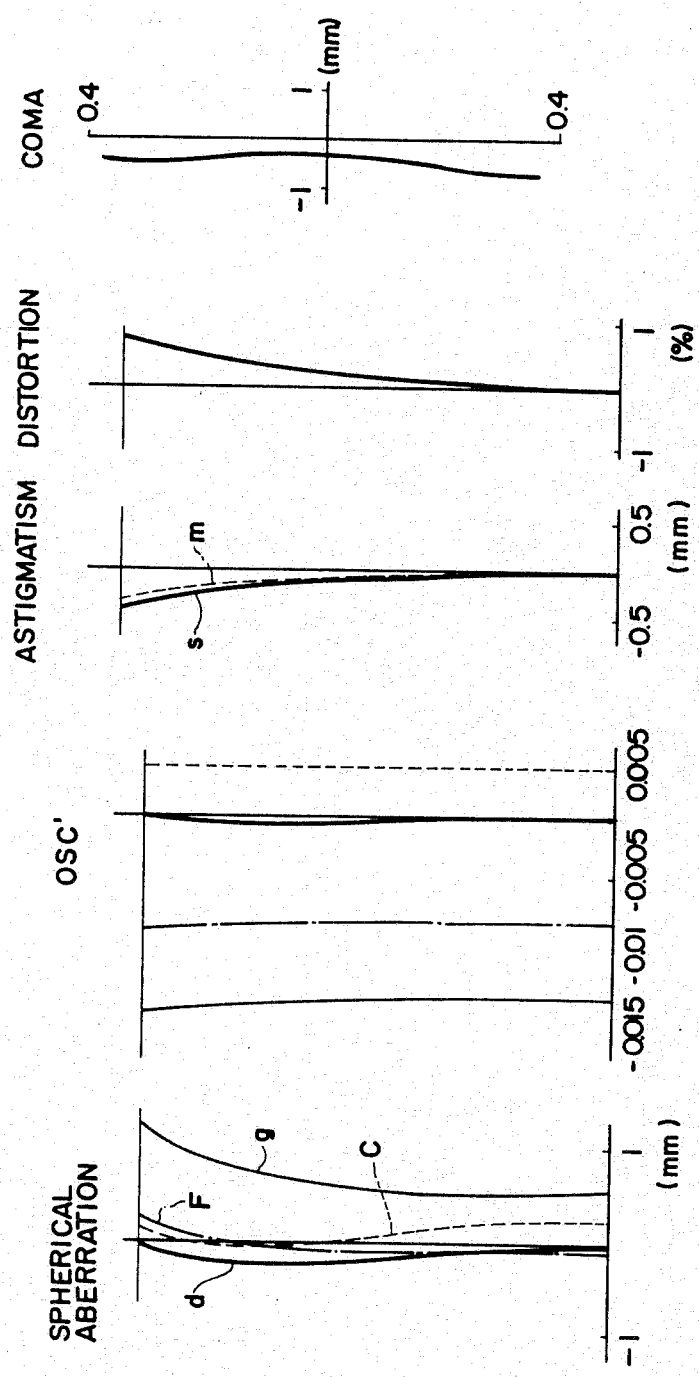
FIG. 4 illustrates curves showing the aberration characteristics of the Embodiment 2.
Figure 5:
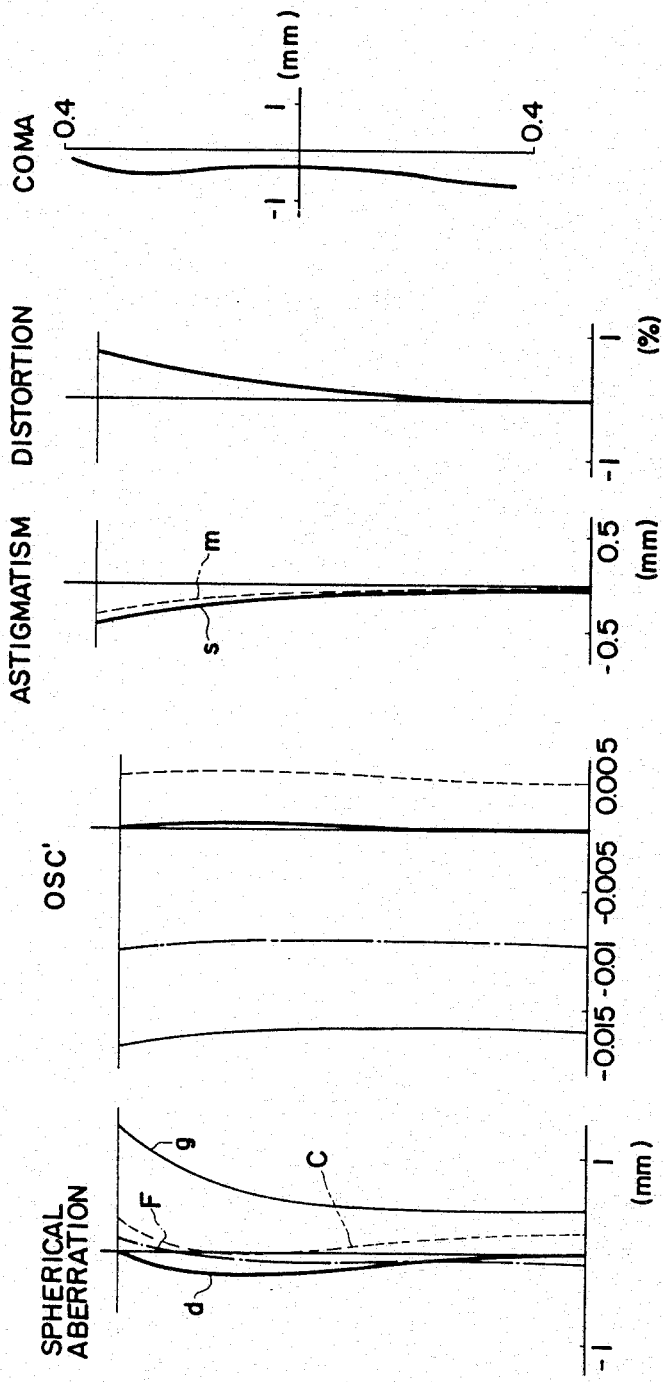
FIG. 5 shows graphs illustrating the aberration characteristics of the Embodiment 3.

Now, some preferred embodiments of the present invention will be described detailedly below:

| Embodiment 1 | | | |
|---|---|---|---|
| f = 1 | NA = 0.4 | β = −20x | WD = 0.7632 |
| $r_1 = -2.5417$ | | | |
| | $d_1 = 0.2862$ | $n_1 = 1.79952$ | $\nu_1 = 42.24$ |
| $r_2 = -0.9012$ | | | |
| | $d_2 = 0.0193$ | | |
| $r_3 = 5.3927$ | | | |
| | $d_3 = 0.1643$ | $n_2 = 1.78472$ | $\nu_2 = 25.71$ |
| $r_4 = 1.2677$ | | | |
| | $d_4 = 0.3722$ | $n_3 = 1.49250$ | $\nu_3 = 81.90$ |
| $r_5 = -1.9863$ | | | |
| | $d_5 = 1.2436$ | | |

Embodiment 1 (continued)

| | | | |
|---|---|---|---|
| $r_6 = 1.9185$ | | | |
| | $d_6 = 0.3645$ | $n_4 = 1.49250$ | $v_4 = 81.90$ |
| $r_7 = -3.4138$ | | | |
| | $d_7 = 0.1938$ | $n_5 = 1.66998$ | $v_5 = 39.32$ |
| $r_8 = -5.0035$ | | | |
| | $d_8 = 0.4620$ | | |
| $r_9 = 1.8588$ | | | |
| | $d_9 = 0.4030$ | $n_6 = 1.71736$ | $v_6 = 29.51$ |
| $r_{10} = 0.9810$ | | | |
| $f_1 = 1.6209$ | | | |
| $f_4 = -3.5832$ | | | |

Embodiment 2

| $f = 1$ | NA = 0.4 | $\beta = -20x$ | WD = 0.7651 |
|---|---|---|---|
| $r_1 = -2.5345$ | | | |
| | $d_1 = 0.2890$ | $n_1 = 1.8061$ | $v_1 = 40.92$ |
| $r_2 = -0.9060$ | | | |
| | $d_2 = 0.0180$ | | |
| $R_3 = 5.4215$ | | | |
| | $d_3 = 0.1541$ | $n_2 = 1.78472$ | $v_2 = 25.71$ |
| $r_4 = 1.2707$ | | | |
| | $d_4 = 0.3610$ | $n_3 = 1.4925$ | $v_3 = 81.90$ |
| $r_5 = -1.9896$ | | | |
| | $d_5 = 1.2653$ | | |
| $r_6 = 1.9330$ | | | |
| | $d_6 = 0.3648$ | $n_4 = 1.4925$ | $v_4 = 81.90$ |
| $r_7 = -3.4433$ | | | |
| | $d_7 = 0.2351$ | $n_5 = 1.6668$ | $v_5 = 33.04$ |
| $r_8 = -4.9679$ | | | |
| | $d_8 = 0.4586$ | | |
| $r_9 = 1.8685$ | | | |
| | $d_9 = 0.3995$ | $n_6 = 1.71736$ | $v_6 = 29.51$ |
| $r_{10} = 0.9847$ | | | |
| $f_1 = 1.6211$ | | | |
| $f_4 = -3.5787$ | | | |

Embodiment 3

| $f = 1$ | NA = 0.4 | $\beta = -20x$ | WD = 0.7586 |
|---|---|---|---|
| $r_1 = -2.4180$ | | | |
| | $d_1 = 0.2702$ | $n_1 = 1.79952$ | $v_1 = 42.24$ |
| $r_2 = -0.8803$ | | | |
| | $d_2 = 0.0064$ | | |
| $r_3 = 4.4237$ | | | |
| | $d_3 = 0.1460$ | $n_2 = 1.78472$ | $v_2 = 25.71$ |
| $r_4 = 1.2806$ | | | |
| | $d_4 = 0.3548$ | $n_3 = 1.4925$ | $v_3 = 81.90$ |
| $r_5 = -2.3545$ | | | |
| | $d_5 = 1.2590$ | | |
| $r_6 = 1.8365$ | | | |
| | $d_6 = 0.2382$ | $n_4 = 1.6727$ | $v_4 = 32.10$ |
| $r_7 = 1.2987$ | | | |
| | $d_7 = 0.3663$ | $n_5 = 1.4925$ | $v_5 = 81.90$ |
| $r_8 = -5.9704$ | | | |
| | $d_8 = 0.4585$ | | |
| $r_9 = 1.6858$ | | | |
| | $d_9 = 0.4047$ | $n_6 = 1.71736$ | $v_6 = 29.51$ |
| $r_{10} = 0.9940$ | | | |
| $f_1 = 1.6061$ | | | |
| $f_4 = -4.4672$ | | | | wherein the reference symbols $r_1$ through $r_{10}$ represents radii of curvature on respective surfaces of the lens elements, the reference symbols $d_1$ through $d_9$ designate thicknesses of the respective lens elements and the airspaces therebetween, the reference sybmols $n_1$ through $n_6$ denote refractive indices of the respective lens elements and the reference symbols $v_1$ through $v_6$ represent Abbe's numbers of the respective lens elements.

Of the embodiments described above, the Embodiments 1 and 2 have such a composition as shown in FIG. 1 wherein the cemented surface of the second lens component is convex on the object side, whereas the cemented surface of the third lens component is concave on the object side. Therefore, the second lens component has a positive lens element on the image side whose refractive index $n_3$ and Abbe's number $v_3$ correspond to $n_{II}$ and $v_{II}$ respectively. Further, the third lens component has a positive lens element on the object side whose refractive index $n_{III}$ and Abbe's number $_{III}$ correspond to $n_4$ and $v_4$ respectively.

The Embodiment 3 has such a composition as shown in FIG. 2 wherein both the cemented surfaces of the second and third lens components are convex on the object side. Therefore, both the second and third lens components comprise positive lens elements on the image side having refractive indices and Abbe's numbers $n_{II}=n_3$, $n_{III}=n_5$, $v_{II}=v_3$ and $v_{III}=v_5$.

I claim:

1. A microscope objective lens system comprising a first positive meniscus lens component having a concave surface on the object side, a second positive cemented lens component, a third positive cemented lens component and a fourth negative meniscus lens component having a concave surface on the image side, and said lens system satisfying the following conditions:
   (1) $1.79 < n_1 < 1.81$
   (2) $40 < v_1 < 43$
   (3) $1.60f < f_1 < 1.63f$
   (4) $3.5f < |f_4| < 4.5f$
   (5) $1.24f < d_5 < 1.27f$ wherein the reference symbol $n_1$ represents the refractive index of said first lens component, the reference symbol $v_1$ designates the Abbe number of said first lens component, the reference symbol $d_5$ denotes the airspace between the second and third lens components and the reference symbols $f_1$, $f_4$ and $f$ represent focal lengths of said first lens component, fourth lens component and the entire lens system as a whole.

2. A microscope objective lens system according to claim 1 having the following numerical data:

| $f = 1$ | NA = 0.4 | $\beta = -20x$ | WD = 0.7632 |
|---|---|---|---|
| $r_1 = -2.5417$ | | | |
| | $d_1 = 0.2862$ | $n_1 = 1.79952$ | $v_1 = 42.24$ |
| $r_2 = -0.9012$ | | | |
| | $d_2 = 0.0193$ | | |
| $r_3 = 5.3927$ | | | |
| | $d_3 = 0.1643$ | $n_2 = 1.78472$ | $v_2 = 25.71$ |
| $r_4 = 1.2677$ | | | |
| | $d_4 = 0.3722$ | $n_3 = 1.49250$ | $v_3 = 81.90$ |
| $r_5 = -1.9863$ | | | |
| | $d_5 = 1.2436$ | | |
| $r_6 = 1.9185$ | | | |
| | $d_6 = 0.3645$ | $n_4 = 1.49250$ | $v_4 = 81.90$ |
| $r_7 = -3.4138$ | | | |
| | $d_7 = 0.1938$ | $n_5 = 1.66998$ | $v_5 = 39.32$ |
| $r_8 = -5.0035$ | | | |
| | $d_8 = 0.4620$ | | |
| $r_9 = 1.8588$ | | | |
| | $d_9 = 0.4030$ | $n_6 = 1.71736$ | $v_6 = 29.51$ |
| $r_{10} = 0.9810$ | | | |
| $f_1 = 1.6209$ | | | |
| $f_4 = -3.5832$ | | | | wherein the reference symbol f represents focal length of the entire lens system as a whole, the reference symbols $r_1$ through $r_{10}$ designate radii of curvature on the respective surfaces of the lens elements, the reference symbols $d_1$ through $d_9$ denote thicknesses of said elements and airspaces therebetween, the reference symbols $n_1$ through $n_6$ represent refractive indices of the respective lens elements, the reference symbols $\nu_1$ through $\nu_6$ designate Abbe's numbers of the respective lens elements and the reference symbols $f_1$ and $f_4$ denote focal lengths of said first and fourth lens components.

3. A microscope objective lens system according to claim 1 having the following numerical data:

| | | | |
|---|---|---|---|
| $f = 1$ | $NA = 0.4$ | $\beta = -20x$ | $WD = 0.7651$ |
| $r_1 = -2.5345$ | | | |
| | $d_1 = 0.2890$ | $n_1 = 1.8061$ | $\nu_1 = 40.92$ |
| $r_2 = -0.9060$ | | | |
| | $d_2 = 0.0180$ | | |
| $r_3 = 5.4215$ | | | |
| | $d_3 = 0.1541$ | $n_2 = 1.78472$ | $\nu_2 = 25.71$ |
| $r_4 = 1.2707$ | | | |
| | $d_4 = 0.3610$ | $n_3 = 1.4925$ | $\nu_3 = 81.90$ |
| $r_5 = -1.9896$ | | | |
| | $d_5 = 1.2653$ | | |
| $r_6 = 1.9330$ | | | |
| | $d_6 = 0.3648$ | $n_4 = 1.4925$ | $\nu_5 = 81.90$ |
| $r_7 = -3.4433$ | | | |
| | $d_7 = 0.2351$ | $n_5 = 1.6668$ | $\nu_5 = 33.04$ |
| $r_8 = -4.9679$ | | | |
| | $d_8 = 0.4586$ | | |
| $r_9 = 1.8685$ | | | |
| | $d_9 = 0.3995$ | $n_6 = 1.71736$ | $\nu_6 = 29.51$ |
| $r_{10} = 0.9847$ | | | |
| $f_1 = 1.6211$ | | | |
| $f_4 = -3.5787$ | | | | wherein the reference symbol f represents focal length of the entire lens system as a whole, the reference symbols $r_1$ through $r_{10}$ designate radii of curvature on the respective surfaces of the lens elements, the reference symbols $d_1$ through $d_9$ denote thicknesses of said elements and airspaces therebetween, the reference symbols $n_1$ through $n_6$ represent refractive indices of the respective lens elements, the reference symbols $\nu_1$ through $\nu_6$ designate Abbe's numbers of the respective lens elements and the reference symbols $f_1$ and $f_4$ denote focal lengths of said first and fourth lens components.

4. A microscope objective lens system according to claim 1 having the following numberical data:

| | | | |
|---|---|---|---|
| $f = 1$ | $NA = 0.4$ | $\beta = -20x$ | $WD = 0.7586$ |
| $r_1 = -2.4180$ | | | |
| | $d_1 = 0.2702$ | $n_1 = 1.79952$ | $\nu_1 = 42.24$ |
| $r_2 = -0.8803$ | | | |
| | $d_2 = 0.0064$ | | |
| $r_3 = 4.4237$ | | | |
| | $d_3 = 0.1460$ | $n_2 = 1.78472$ | $\nu_2 = 25.71$ |
| $r_4 = 1.2806$ | | | |
| | $d_4 = 0.3548$ | $n_3 = 1.4925$ | $\nu_3 = 81.90$ |
| $r_5 = -2.3545$ | | | |
| | $d_5 = 1.2590$ | | |
| $r_6 = 1.8365$ | | | |
| | $d_6 = 0.2382$ | $n_4 = 1.6727$ | $\nu_4 = 32.10$ |
| $r_7 = 1.2987$ | | | |
| | $d_7 = 0.3663$ | $n_5 = 1.4925$ | $\nu_5 = 81.90$ |
| $r_8 = -5.9704$ | | | |
| | $d_8 = 0.4585$ | | |
| $r_9 = 1.6858$ | | | |
| | $d_9 = 0.4047$ | $n_6 = 1.71736$ | $\nu_6 = 29.51$ |
| $r_{10} = 0.9940$ | | | |
| $f_1 = 1.6061$ | | | |
| $f_4 = -4.4672$ | | | | wherein the reference symbol f represents focal length of the entire lens system as a whole, the reference symbols $r_1$ through $r_{10}$ designate radii of curvature on the respective surfaces of the lens elements, the reference symbols $d_1$ through $d_9$ denote thicknesses of said elements and airspaces therebetween, the reference symbols $n_1$ through $n_6$ represent refractive indices of the respective lens elements, the reference symbols $\nu_1$ through $\nu_6$ designate Abbe's numbers of the respective lens elements and the reference symbols $f_1$ and $f_4$ denote focal lengths of said first and fourth lens components.

* * * * *